United States Patent [19]

Fuller et al.

[11] Patent Number: 4,505,787

[45] Date of Patent: Mar. 19, 1985

[54] PROCESS FOR PRODUCTION OF A CARBIDE BY-PRODUCT WITH MICROWAVE ENERGY AND ALUMINUM BY ELECTROLYSIS

[75] Inventors: Tom E. Fuller, Phoenix; Lewis R. Finell, Scottsdale, both of Ariz.

[73] Assignee: Super Fuel Systems Incorporated, Phoenix, Ariz.

[21] Appl. No.: 282,938

[22] Filed: Jul. 13, 1981

[51] Int. Cl.³ ............... C25C 3/06; C25C 7/06; B01J 19/12
[52] U.S. Cl. ............... 204/67; 204/243 R; 423/440; 423/442; 422/186
[58] Field of Search ............... 204/67, 243, 157.1 R, 204/193, DIG. 3, DIG. 4, DIG. 5; 423/442, 440; 422/186, 109, 110

[56] References Cited

U.S. PATENT DOCUMENTS

| | | | |
|---|---|---|---|
| 3,227,642 | 1/1966 | Lemelson | 204/193 |
| 3,940,324 | 2/1976 | Abramson et al. | 204/157.1 H |
| 4,113,836 | 9/1978 | O'Connor | 422/109 |
| 4,140,602 | 2/1979 | Lewis et al. | 204/157.1 H |
| 4,221,762 | 9/1980 | Andrjushin et al. | 423/442 |
| 4,311,570 | 1/1982 | Cowen et al. | 204/157.1 R |
| 4,324,624 | 4/1982 | Diller | 204/157.1 H |
| 4,365,975 | 12/1982 | Williams et al. | 204/157.1 R |

Primary Examiner—Howard S. Williams
Attorney, Agent, or Firm—James F. Duffy

[57] ABSTRACT

Means and method for utilizing radiated electromagnetic energy to elevate at least one of two or more reactants 16 to a temperature at which a chemical reaction will take place so as to provide a desired reaction product 161. In practice, at least one of reactants 16 must be, or be made, susceptible to heating when radiated with electromagnetic energy. Electromagnetic energy source 12 provides sufficient power to raise the temperature of said at least one reactant 16 to cause that reactant to further raise the temperature of associated reactant materials making them further susceptible to heating under the influence of the impinging electromagnetic energy waves. The electromagnetic energy is provided at sufficient power to raise the temperature to the point at which reactants 16 will react chemically to produce a desired reaction product. Since the heating action is localized, little or no energy is wasted in raising the wall temperatures of the reaction vessel 11 in which the material 16 is radiated. The use of a temperature sensitive sphincter output 19 of reactor vessel 11 provides means for recovering the desired chemical reaction product and for controlling the active time of microwave energy source 12 and the injection of new reactant material 16 when the product of the reaction 161 is drawn off.

37 Claims, 3 Drawing Figures

PROCESS FOR PRODUCTION OF A CARBIDE BY-PRODUCT WITH MICROWAVE ENERGY AND ALUMINUM BY ELECTROLYSIS

TECHNICAL FIELD

The invention relates to the field in which two or more reactants are brought together under elevated temperature conditions, and sometimes in the presence of electrolysis, so as to cause the reactants to chemically combine.

The invention is specifically related to the field of such reactions in which the energy requirements to reach such elevated temperatures are extremely high.

The invention more specifically relates to the field of such reactions in which a microwave source of radiation is employed to radiate the reactants so as to bring the temperature of the reactants to the point at which the chemical reaction will occur.

BACKGROUND ART

The industrialized world is becoming acutely conscious of energy consumed in industrial processes. Indeed, with the rising costs of energy and the depletion of means for producing energy, the general consuming public is actively involved in a crusade to eliminate waste in the consumption of energy. Thus home kitchens, as well as those in restaurants large and small, are resorting to the use of microwave powered ovens, not only for the speed of food preparation, but because the overall power consumption of microwave ovens is significantly less than that required by conventional electrical resistance heated ovens. Those skilled in the art of heating by microwave radiation have been adapt at applying the advantages of this heating technique to processes other than that of food preparation.

In U.S. Pat. No. 3,585,258, issued June 15, 1971, Levinson teaches that a microwave source may be used to heat a mass of lossy material, which lossy material in turn provides a heat source within a kiln whereby wet clay objects may be fired.

An article, such as a plate or a bowl, may be directly heated with microwave energy if the article is manufactured in accordance with the disclosure provided by Sutton et al in U.S. Pat. No. 4,219,361 issued Aug. 26, 1980. Sutton et al teaches that an article may be made of materials which are not normally susceptible to heating by means of microwave energy if the basic material of which the article is comprised is first mixed with another material which is susceptible to heating by microwave energy radiation. The disclosure teaches that the following materials may be added to the basic material to make it susceptible to heating by microwave energy: cobalt oxide, chromium nitride, iron oxide, manganese dioxide, nickelous oxide, nickelic oxide, and calcium aluminate. The mixture of compounds susceptible to heating by microwave and those which display no such susceptibility remain a mixture within the final article produced, there being no chemical reaction taking place between the materials.

Bardet, in U.S. Pat. No. 4,100,386 issued July 11, 1978, teaches that a ceramic or refractory material, not normally susceptible to heating by microwave energy, may be melted when placed within a microwave cavity in close proximity to a probe made of a lossy material. The lossy material causes an increase in temperature at the proximate end of the ceramic material. Further, the electromagnetic field within the cavity is increased at this point due to the insertion and heating of the lossy material probe. The heating of the lossy probe causes the ceramic material to likewise experience a rise in temperature. As its temperature rises, the dielectric constant and the loss tangent of the ceramic material increases which in turn increases its susceptibility to heating by the impinging electromagnetic field. A point is soon reached at which the lossy probe may be removed and the heating of the ceramic material will continue apace until melting of the ceramic material occurs. Bardet discloses the melting of a pure silica bar of material and the drawing therefrom of a continuous thread of silica.

The process of Sutton et al, noted above, is brought to mind by the disclosure of Nishitani in U.S. Pat. No. 4,147,911. Nishitani's disclosure is directed toward the sintering of refractory materials, sintering being defined as the forming of a solid by compacting a powder and heating same below the melting point of the powdered material for several hours. A solid form then results. Nishitani finds that the process may be expedited by the inclusion of metallic particles within the refractory material. However, the conductive materials must first be micro-pulverized so that the conductive particles are no greater than ten times the skin depth of penetration of the microwave energy impinging on the refractory material. Heating of both the refractory material and the micro-pulverized conductive particles thus takes place due to the reaction of the conductive particles with the microwave field.

Another patent concerning the sintering of ceramic materials is that of Lacombe-Allard in U.S. Pat. No. 4,057,702 issued Nov. 8, 1977. Lacombe-Allard acknowledges the fact that ceramic materials and, in particular, refractory oxides may be made susceptible to heating under the influence of microwave energy by the incorporation within the ceramic composition of additives which are rapidly heated under the influence of an electromagnetic field. However, certain disadvantages of this approach are pointed out by Lacombe-Allard. He notes that the rise in temperature of the ceramic composition is initially very slow giving as an example that three-quarters of the total time of the operation may be required to raise the product to be sintered to a temperature which is less than one-half the sintering temperature. He notes further that special precautions must be taken to ensure homogenous heating of the products to be sintered and to control a rapid increase in the heating action as the sintering temperature is approached. In addition, the supports on which such ceramic material is emplaced in the microwave field are often susceptible to excessive heating which may affect the uniformity of heating of the ceramic material being sintered. To avoid these problems, Lacombe-Allard teaches that the refractory materials should be raised in temperature using conventional heating means prior to being introduced to the electromagnetic field radiated by the microwave source. By raising the temperature of the refractory materials, their dielectric constant and loss tangent are increased so that when they are exposed to the microwave radiation, they are susceptible to heating thereby and are rapidly brought to the sintering temperature. Thus, the disadvantages of additives to the basic refractory material are avoided.

All of the known art, as cited above, is directed toward the principle that a material which is not susceptible to heating by exposure to microwave radiation may have its temperature raised by placing it in close proximity to a material which is susceptible to such heating. The suceptible material is chosen for its susceptibility to heating upon exposure to microwave radiation and for its lack of reaction with the nonsusceptible material. None of the known prior art teaches that microwave energy radiation may be employed to bring about a chemical reaction between two or more reactants.

It is therefore an objective of the present invention to provide means and method for utilizing microwave radiation to being about a chemical reaction of two or more reactants radiated by an electromagnetic radio field.

It is a specific objective of the invention to provide means and method for utilizing a microwave energy source as the source of the electromagnetic radiation for bringing about the chemical reaction of two or more reactants.

It is a particular objective of the invention to provide means and method for utilizing electromagnetic radiation in the production of carbide.

It is a most specific objective of the invention to provide means and method for utilizing electromagnetic radiation in cooperation with an electrolysis process for causing the chemical reaction of two or more reactants.

DISCLOSURE OF INVENTION

The invention provides energy efficient means and method for producing a chemical reaction at elevated temperatures between two or more reactant materials. The apparatus and means disclosed are readily utilized in reactions that require both high temperatures and electrolysis to provide the final end product of the chemical reaction.

The invention discloses the use of electromagnetic radiation means for radiating two or more reactants, for raising the temperature of at least one of said two or more reactants to a sufficient temperature to cause the temperature of all said reactants to elevate sufficiently to produce a chemical reaction resulting in an end product which comprises at least one of a fluid, a gas, and a solid chemical product. The electromagnetic radiation means comprises a microwave radiator of sufficient power to raise at least one of the two or more reactants to the temperature at which the chemical reaction will occur. Thus, where the two or more reactants comprise at least a solid material having therein chemically combined volatile components, the chemical reaction under elevated temperature is that of calcination. When the elevation of temperature is utilized in cooperation with electrolysis and the reactants comprise carbon, alumina, and cryolite, the chemical reaction produces aluminum and carbon dioxide. Where the reactants comprise carbon and elements of at least one of a metal, and boron, and silicon in at least one of its elemental, and oxide, and hydride forms, the chemical reaction under elevated temperatures, produces a carbide as a by-product. Thus, the chemical reaction between carbon and calcium oxide under the elevated temperatures produced by radiating these materials with microwave energy is calcium carbide. The carbon, as a lossy absorber of microwave energy, converts the impinging microwave energy to heat which is conducted to, for example, calcium oxide and the calcium oxide is raised in temperature both by heat conducted to it from the carbon material as well as the heat generated within the calcium oxide due to its increased ability to absorb microwave energy as the elevated temperature increases the loss tangent and dielectric constant of the calcium oxide.

Means and method for producing carbide by electromagnetic radiation of reactant materials is disclosed in an exemplary embodiment setting forth a system for the production of calcium carbide, which system utilizes, or preserves, all of the other by-products of the chemical reaction between carbon and calcium oxide.

Where the carbide produced is susceptible to the production of a gaseous fuel, some of the carbide produced is diverted for production of such a gaseous fuel for use in the production process. Examples of carbides which may be utilized for the production of a gaseous fuel include both calcium carbide and barium carbide which react with water to produce acetylene gas; and aluminum carbide which reacts with water to produce a methane gas. In addition, the carbon monoxide gas by-product of such chemical reactions may be recovered and combined with a fine spray of water in a gas generator to produce the combustible fuel known as water gas. This water gas, so produced, may also be utilized within the carbide production process.

A microwave energy radiation source, its power supply and the reaction vessel, not only provide for rapid heating of the reactant materials at relatively low average energy levels, but require relatively little space when compared to prior art reaction ovens. Thus, much of the apparatus of the invention may be carried aboard a readily transportable platform, for example, a tractor-truck trailer, and transported to a site at which one or more of the reactant materials is readily available.

A method for the utilization of the apparatus of the invention to produce carbide is set forth in detail.

BEST MODE FOR CARRYING OUT THE INVENTION

Figure 1:
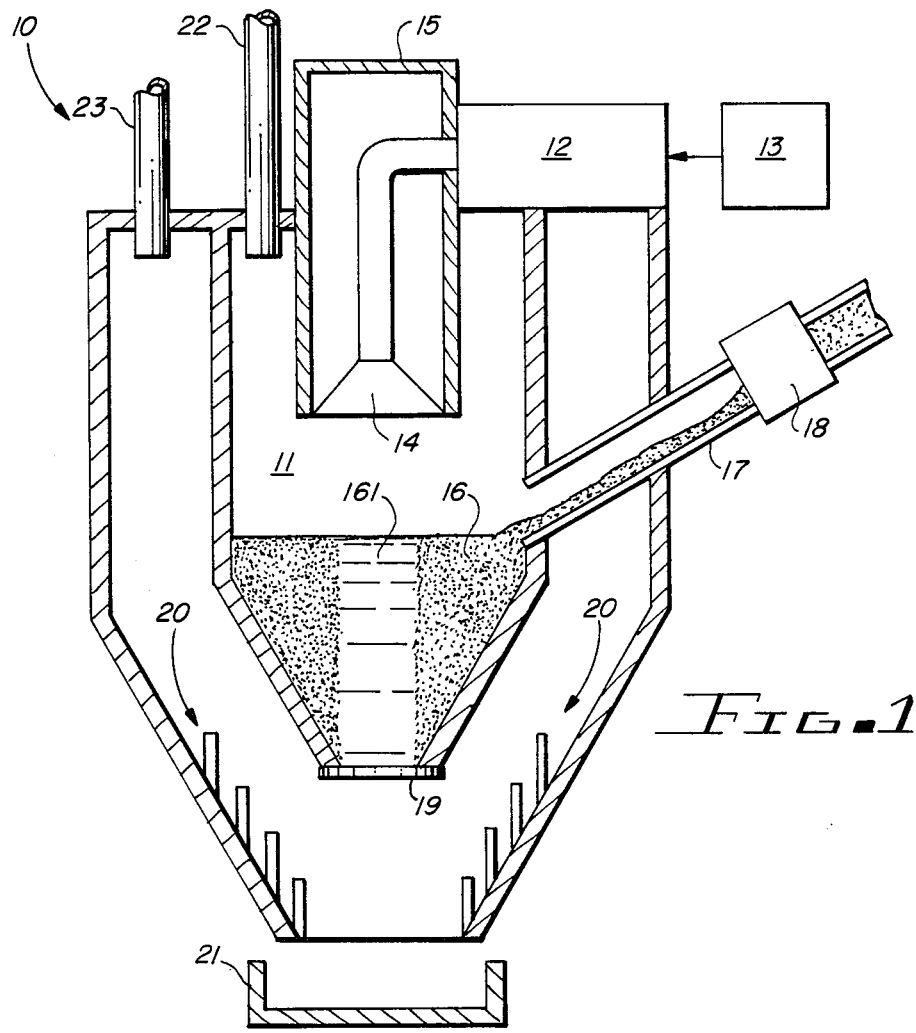
FIG. 1 illustrates a reactor vessel having therein reactant materials being radiated with electromagnetic energy from a microwave energy source.

The invention is dedicated to the reduction of electrical energy required to bring about a chemical reaction between two or more reactants under at least one of elevated temperatures and electrolysis. To this end, as illustrated in FIG. 1, the invention provides a reactor vessel 11 which may comprise a tuned, or tunable microwave cavity. A source of electromagnetic energy 12 in the microwave frequency range of the spectrum is powered by power supply 13 which draws its electrical energy from conventional power sources. Thus, power supply 13 may be a gasoline driven electrical generator or it may draw its source of energy from public power lines.

The electromagnetic energy from microwave source 12 is coupled to a microwave radiator 14. Radiator 14 is illustrated as a wave guide driven horn radiator but this illustration is provided for exemplary purposes only and it is not intended to limit the form of radiator utilized.

Radiator 14 is maintained in position by radiator support structure 15 which may also comprise part of the tunable structure of reactor vessel 11.

Two or more reactants 16 are injected into reactor vessel 11 through input 17. The amount of reactant materials 16 so injected is controlled by valve 18 which is coupled to a source of reactants now shown.

At least one of the reactants 16 must be capable of absorbing microwave energy impinging upon it and converting the energy so absorbed to heat. Carbon is a known absorber of microwave energy and is frequently employed as a lossy termination in many wave guide structures. Other materials, not normally susceptible to heating by microwave, may be so by initially raising their temperature utilizing conventional heating means so as to raise the dielectric constant and loss tangent of the material to the point at which it does become susceptible to being heated when radiated with microwave energy.

Heating by microwave is different from conventional heating processes. In conventional processes, heat itself is applied to the material and first heats the surfaces of the material and then moves internal of the material by conduction. In the microwave process, the microwave energy is dissipated uniformly throughout the body and heat is generated quickly and uniformly throughout the material. Thus, heat efficiencies are maximized. Further heating efficiencies are realized in that microwave heating can be achieved in relatively cool surroundings since only the material subjected to radiation is heated.

When microwave energy is directed from radiator 14 to a mass of reactant 16 within reactor vessel 11, the central core of the mass is rapidly heated and temperatures exceeding 2000° C. are readily achieved. Under these conditions, the reactants within the central core 161 of material 16 enter into a chemical reaction to produce a chemical by-product from the original mixture of reactants 16.

A temperature controlled sphincter outlet 19 senses the temperature of the molten reaction product 161 causing the sphincter outlet to open and permit the reaction product 161 to pass through to molten mass conveyor 21 from whence it is transported to be further processed as required. Conventional gas-fired burners 20 maintain sphincter outlet 19 at a temperature close to, but less than, the temperature of the molten reaction product 161. This external heating by gas-fired burners 20 of sphincter 19 is done so that the opening of sphincter 19 by contact with the molten reaction product 161 is anticipated and little time is required to raise the temperature of sphincter 19 to its activating temperature by conduction of heat from the reaction product 161.

The dashed line shown coupling microwave energy source 12, reactant material control valve 18, and sphincter 19 represents an electromechanical coupling which is activated by the opening and closing of sphincter 19. When the reaction product 161 has achieved the temperature at which sphincter 19 opens, the opening of sphincter 19 causes the transmission of microwave energy to cease and reactant material flow control valve 18 to open so as to replace the material evacuated from reactant material 16 when the reaction product 161 passes through sphincter 19. Since the entire mass of reactant material 16 is not raised to the reaction temperature, a generally cylindrical void is left within material 16 when the molten reaction product 161 is drawn off through sphincter 19. Additional reactant material 16 entering reactor vessel 11 through input 17 moves into this generally cylindrical void. A portion of the initial charge of the additional reactant material 16 will move through sphincter 19. However, sphincter 19 will react rapidly to the reduced temperature levels so that the sphincter 19 closes to prevent egress of reactant materials 16. With the closure of sphincter 19, reactant control valve 18 closes to prevent entry of additional reactant material 16 into reactor vessel 11 and microwave energy source 12 is again energized so that the material 16 within reactor vessel 11 is again subjected to electromagnetic radiation.

The process is then repeated. Each time a core of molten reaction product 161 is formed, the sphincter 19 opens and draws off the reaction product 161 and new reactant material 16 is injected into reactor vessel 11 through input 17. Such reactant material 16 as passes through sphincter 19 without being subjected to the chemical reaction which takes place within reactor vessel 11, is readily separated from the reaction product 161 and may be returned to the source, not shown, of reactant material 16 which supplies input 17 through control valve 18.

Reaction vessel 11 is provided with an exhaust outlet 22 so that gaseous by-products of the reaction and solids, in the form of dust, may be drawn off for further processing as desired.

Figure 3:
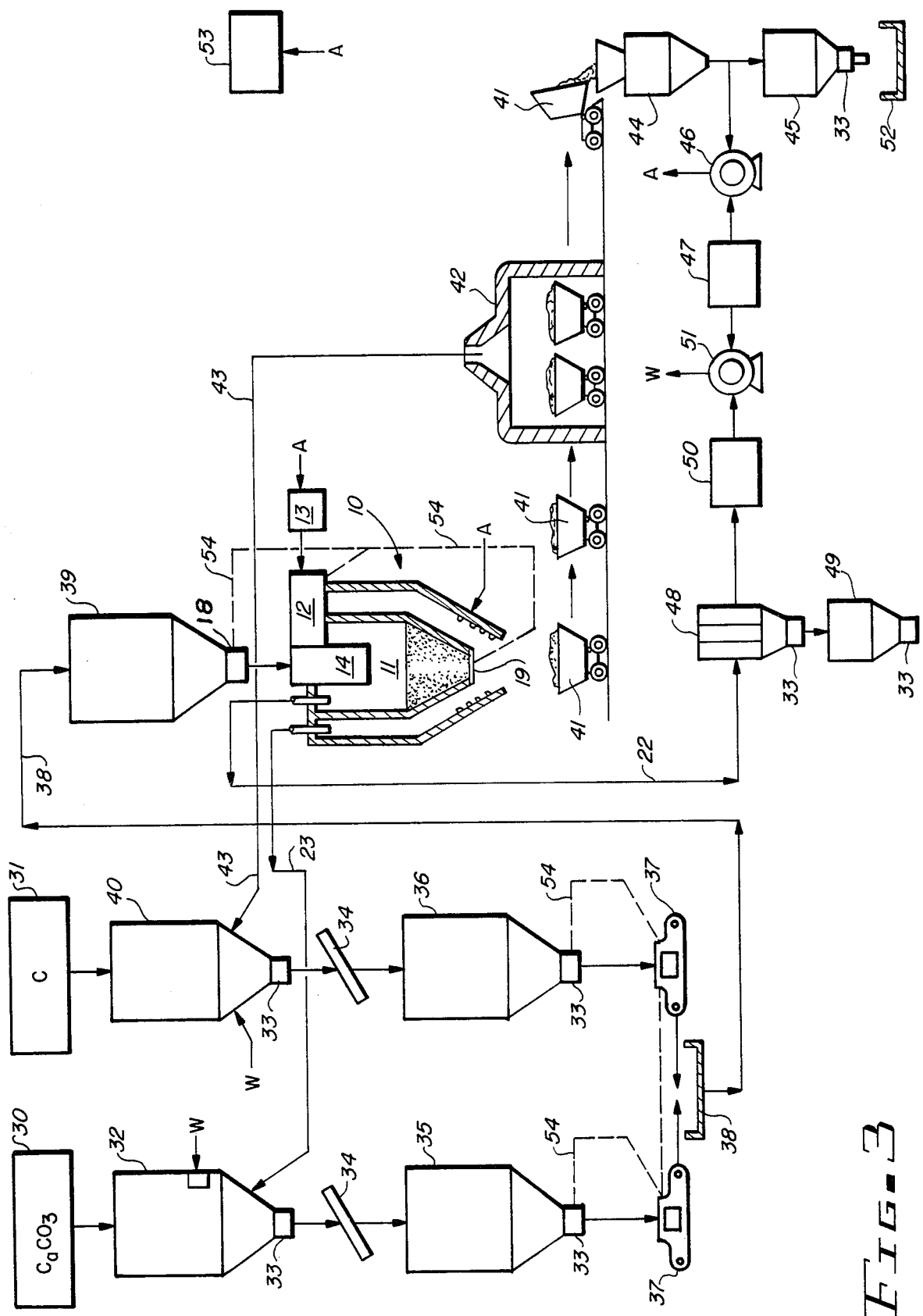
FIG. 3 is a process flow diagram setting forth means and method for producing calcium carbide utilizing an electromagnetic energy radiator to bring about the reaction between the reactant components.

Gas-fired burners 20 have their exhaust gases drawn off through flue 23. The use of such exhaust gases will be discussed further when the system of FIG. 3 is disclosed.

The reactant material 16, which lies outside the radiated beam of microwave energy and which remains within reactor vessel 11 when the molten reaction product 161 is drawn off through sphincter 19, serves a useful purpose. This material acts as an insulator which preserves the walls of reactor vessel 11 from the effects of the extremely high temperatures achieved within the reactant material 16 forming reaction product 161. The presence of this material in no way impedes maintanence of microwave reactor 10 since all of the components required for the transmission and radiation of microwave energy into reactant mass 16 lie above that mass. With conventional, prior art heaters, the residual build-up of reactant products on the wall of the heater must be manually chiseled and broken away when maintanance on the heater is required.

Unlike prior art uses of microwave wherein material is heated for purposes of drying or sintering same, the apparatus of FIG. 1 utilizes a source of microwave energy 12 of sufficient power to cause an actual chemical reaction to take place within the reactant material 16. Thus, for example, if reactant material 16 comprises carbon and calcium oxide, the by-product 161 will comprise calcium carbide. The by-product will comprise aluminum carbide if reactant material 16 is made up of carbon and aluminum oxide.

As another example, if material 16 comprises calcium oxide chemically bonded to the volatile gas carbon dioxide so that material 16 comprises calcium carbonate, the chemical reaction which takes place is one of decomposition and the reaction product 161 is calcium oxide while a second by-product, carbon dioxide, will be drawn off through exhaust 22. This process, whereby a volatile element is freed of its chemical bonds with another element, is known as calcination.

Figure 2:
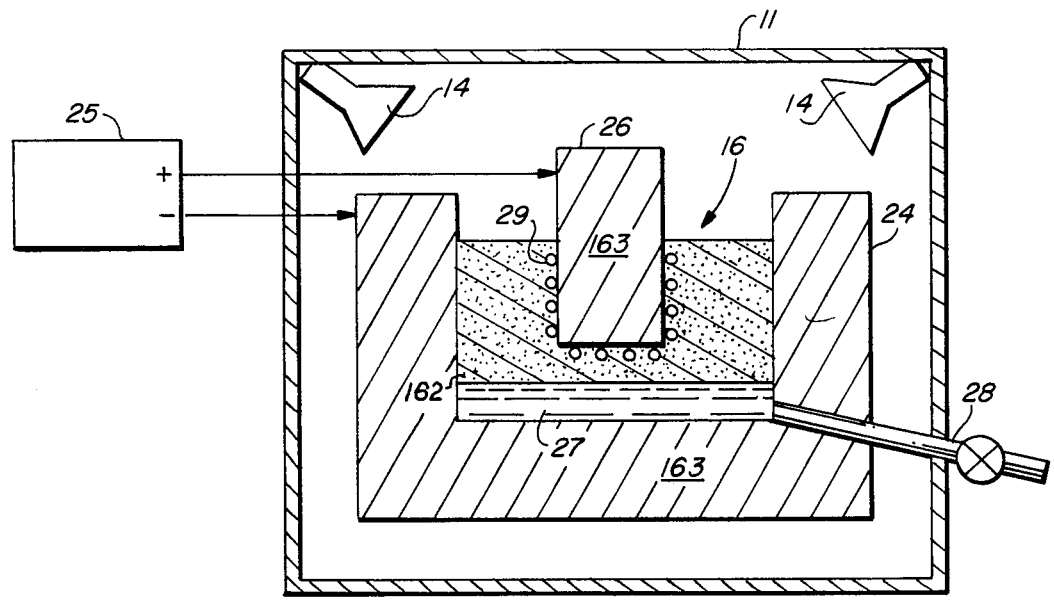
FIG. 2 illustrates a reactor vessel in which the reactants are subjected both to radiation from an electromagnetic energy source and to electrolysis so as to produce aluminum and carbon dioxide.

The invention may be adapted to the production of aluminum and carbon dioxide. FIG. 2 shows the elements required for the Hall-Heroult process of manufacturing aluminum and carbon dioxide with the heat for the process being derived from a microwave source, not shown, coupled to radiators 14. Within reactor vessel 11, reactants 16 are emplaced so that they may be radiated with electromagnetic energy from radiators 14. In addition to the heat derived from the electromagnetic radiation an electrolysis process powered by power supply 25 is also employed. An electrolyte 162 is comprised of a mixture of fused alumina and cryolite contained within fluid retaining vessel 24. Vessel 24 is comprised of carbon 163. In the electrolysis process, vessel 24 is connected as the cathode to power supply 25. Immersed within the electrolyte 162 is an anode 26 which is connected to the positive output of power supply 25. Anode 26 is also comprised of carbon 163.

Cryolite melts at a temperature a little below 1000° C. This temperature is provided by radiating carbon vessel 24 and anode 26 with electromagnetic energy from radiators 14. The carbon 163 absorbs the microwave energy and converts this energy to heat. At a little above its melting point, cryolite will dissolve alumina. The electrolyte will thus contain free ions of aluminum and oxygen. The positive aluminum ions are drawn to the cathodic walls of vessel 24 and molten aluminum 27 accumulates at the base of vessel 24. The oxygen ions are drawn to anode 26 forming free oxygen which combines with the carbon 163 of anode 26 to form carbon dioxide. The molten aluminum 27 is drawn off through outlet 28. The heat generated within anode 26 by its absorption of microwave energy from radiators 14 hastens this secondary electrolysis production of carbide dioxide.

Carbide is a by-product of the chemical reaction among reactants comprising carbon and an element of at least one of a metal and boron and silicon in at least one of its elemental, and oxide and hydride forms. A system for producing carbides may be built around the electromagnetic radiation reactor disclosed in FIG. 1. A system for the production of calcium carbide has been chosen as an exemplary system and is illustrated in FIG. 3. The process will be understood to be readily adaptable to the production of other carbides than calcium carbide for example: aluminum carbide, boron carbide or silicon carbide.

A source of calcium carbonate 30 is coupled to a calcining kiln 32 wherein the calcium carbonate from source 30 is reduced to calcium oxide. The calcium oxide material is output through control valve 33 and passes through screens 34 to temporary storage hopper 35.

A source of carbon 31 is coupled to a dryer 40 wherein excess moisture is removed from the carbon received from source 31. The dried carbon exits dryer 40 through control valve 33 passing through screens 34 to hopper 36 for temporary storage.

Both calcium oxide hopper 35 and carbon hopper 36 have output control valves 33 at their outputs. As indicated by the dashed lines, these particular control valves 33 are electromechanically coupled to weighing conveyors 37 so that the valve will open and close in response to a desired weight setting of the controls of weighing conveyor 37. Thus, by proper establishment of the controls of weighing conveyor 37, calcium oxide and carbon, in the proper proportions to form calcium carbide, will be output from hoppers 35 and 36, respectively, to weighing conveyors 37 from whence they are deposited on conveyor 38 for conveyance to reactant materials hopper 39.

Reactant materials hopper 39 is provided internally with means for agitating the materials conveyed to it so as to thoroughly mix the reactants.

The output of reactant materials hopper 39 is coupled through control valve 18 to electromagnetic radiation reactor 10 as is shown in greater detail in FIG. 1. There, in reactor vessel 11, the materials are radiated and brought to a temperature at which they react to produce a calcium carbide by-product.

The calcium carbide by-product formed in reactor vessel 11 causes sphincter 19 to open and the calcium carbide to pass therethrough to product conveyance 41. Product conveyance 41 moves the material to heat recovery zone 42 where the heat of the calcium carbide is recovered and passed through heat pipe 43 to dryer 40 to provide the necessary heat for drying the carbon from carbon source 31. Conveyance 41 then moves the calcium carbide product to a crusher 44 which breaks the frozen carbide mass to reasonably uniform particle size.

From crusher 44, the carbide product passes to carbide hopper 45 from whence it may be drawn through control valve 33 to product conveyor 52 for further processing, bagging, transportation, or the like.

A portion of the carbide product is diverted from the output of crusher 44 to gas generator 46. A water source 47 is also coupled to gas generator 46. Calcium carbide and water react to form acetylene gas which is a combustible fuel product. The acetylene gas A may be utilized to fuel an engine driven generator in power supply 13 to provide the source of power for microwave energy source 12 and similarly to provide the fuel for an engine driven generator 53 whose output may be used to meet the other electrical requirements of the process. Acetylene gas A may also be utilized to fuel gas fired burners 20 in electromagnetic radiation reactor 10.

Concerning gas-fired burners 20, the exhaust gases from these burners 20 are passed through flue 23 to calcining hopper 32 from whence it passes over the calcium oxide being formed therein. In its passage over the calcium oxide, the calcium oxide is darkened, or blackened. Blackening the surfaces of the calcium oxide particles is disclosed here as an aid in making the calcium oxide particles more susceptible to heating when radiated with electromagnetic energy.

Exhaust 22, coupled to reactor vessel 11, draws off the gaseous and dust by-products of the chemical reaction generated by exposing the reactants to the heating effects of microwave radiation. These dust and gas particles pass through exhaust 22 to bag filter 48. The dust solids, for example magnesium, pass through control valve 33 to dust hopper 49 from which they may be recovered. The gaseous by-products continue to cleaner and tar remover 50. Carbon monoxide gas is coupled from cleaner and tar remover 50 to gas generator 51, which is also coupled to water source 47.

Carbon monoxide and water form water gas W within gas generator 51. Water gas W may be used as was the acetylene gas A produced at gas generator 46. Its use is illustrated for exemplary purposes in FIG. 3 as the fuel for the calcining process taking place in calcining kiln 32 and as an auxiliary source of fuel for carbon dryer 40. Those skilled in the art will understand that water gas W and acetylene gas A may be utilized interchangeably at any of the positions designated in FIG. 3.

In addition to calcium carbide, barium carbide likewise reacts with water to produce acetylene while aluminum carbide reacts with water to produce methane. Thus, in the production of barium or aluminum carbides, part of the product of the reaction in electromagnetic radiation reactor 10 may be utilized as a source of fuel for use in carrying out the process illustrated in FIG. 3.

Microdry Corporation of San Ramon, Calif., a supplier of microwave energy drying equipment, reports user energy savings of twenty-five to fifty-two percent when compared with conventional drying methods. Thus, the use of a microwave powered reactor to bring about a chemical reaction under elevated temperature conditions should result in a substantial energy cost saving when compared with prior art conventional techniques.

Means and method have now been disclosed for utilizing radiated electromagnetic energy to elevate at least one of two or more reactants to a temperature at which a chemical reaction will take place so as to provide a desired reaction product. In practice, one of the reactants must be, or be made, susceptible to heating when radiated with electromagnetic energy. The electromagnetic energy source provides sufficient power to raise the temperature of said at least one reactant to cause that reactant to further raise the temperature of the associated reactant materials making them further susceptible to heating under the influence of the impinging electromagnetic energy waves. The electromagnetic energy is provided at sufficient power to raise the temperature to the point at which the reactants will react chemically to produce a desired reaction product. Since the heating action is localized, little or no energy is wasted in raising the wall temperatures of the reaction vessel in which the material is radiated. The use of a temperature sensitive sphincter output of the reactor vessel has been disclosed as means for recovering the desired chemical reaction product and for controlling the active time of the microwave energy source and the injection of new reactant materials when the product of the reaction is drawn off.

Those skilled in the art will derive other embodiments drawn from the teachings herein. To the extent that such embodiments are so drawn, it is intended that such embodiments will fall within the ambit of protection provided by the claims set forth hereinafter.

Having described my invention in the foregoing specification and the drawings accompanying it in such a clear and concise manner that those skilled in the art may readily and easily practice the invention, I claim that which is set forth in the following claims:

1. In apparatus having therein two or more reactants and means for subjecting said reactants to at least one of elevated temperatures and electrolysis for causing said reactants to react chemically, the improvement resulting in greatly reduced energy demand wherein said means for subjecting said reactants to an elevated temperature comprises:

electromagnetic radiation means for radiating said two or more reactants with electromagnetic energy other than heat waves for raising the temperature of at least one of said two or more reactants to a sufficient temperature to elevate the temperature of all said reactants sufficiently to cause said reactants to react chemically to produce at least one of a fluid and a gaseous and a solid chemical product, said electromagnetic radiation means comprising a microwave power source of sufficient power to raise said at least one reactant to the temperature at which said reactants react chemically;

a microwave reaction vessel in which said chemical reaction takes place when said reactants are radiated therein by said electromagnetic radiation means;

said reaction vessel further comprising controlled means for injecting reactants to be radiated into said reaction vessel;

said reaction vessel further comprising controlled means for outputting reaction by-products of said chemical reaction from said reaction vessel; and further comprising control linkages coupling said microwave power source, said controlled means for injecting reactants into said reaction vessel, and said means for outputting chemical reaction by-products from said reaction vessel for de-energizing said electromagnetic radiation means while said outputting means is operative to output reaction by-products and for activating said injecting means to inject a reactant material charge to replace the reaction by-products being output by said outputting means.

2. The improvement of claim 1 wherein said means for outputting chemical reaction by-products comprise temperature sensing emission means for alternately aiding and impeding the output of said reaction by-products from said reaction vessel.

3. The improvement of claim 2 wherein said temperature sensing emission means further comprises a temperature sensing sphincter which opens when its temperature exceeds the reaction temperature of said reactants and which closes when its temperature falls below said reaction temperature.

4. In apparatus having therein two or more reactants and means for subjecting said reactants to at least one of elevated temperatures and electrolysis for causing said reactants to react chemically to produce carbide, the improvement resulting in greatly reduced energy demand wherein said means for subjecting said reactants to an elevated temperature comprises:

a reaction vessel having input means coupled to a source of carbon and material comprising at least one of a metal and boron and silicon;

a microwave energy source having an output coupled to said reaction vessel for radiating carbon and said material therein for raising the temperature of said carbon by absorption of microwave energy to a temperature to cause a chemical reaction of said carbon with said material producing a carbide as a by-product; and gas generation means coupled to said reaction vessel for accepting at least a portion of the carbide by-product of said chemical reaction and generating combustible gas fuel therefrom when the carbide produced is susceptible to such gas production.

5. The improvement of claim 4 wherein said reaction vessel further comprises first output means from which may be drawn gas and dust by-products of said reaction of carbon and said material.

6. The improvement of claim 5 further comprising filter means coupled to said first output means of said reaction vessel for recovery of dust by-products of said reaction.

7. The improvement of claim 5 further comprising cleaning and tar removal apparatus coupled to said first output means of said reaction vessel for cleaning and removing any tar from the gases of said reaction.

8. The improvement of claim 7 further comprising water gas generation means coupled to said cleaning and tar removal means for accepting any carbon monoxide gas products output thereby and generating combustible water gas fuel.

9. The improvement of claim 4 wherein said reaction vessel further comprises second output means for outputting the carbide by-products of said chemical reaction.

10. The improvement of claim 9 further comprising means coupled to said second output means for recovering heat from said carbide output from said reaction vessel.

11. The improvement of claim 4 further comprising:
a source of calcium carbonate, limestone; and
a calcining kiln coupled to said source of calcium carbonate for accepting limestone therefrom and converting same to calcium oxide to provide a source of said calcium oxide to said reaction vessel, the by-product of said chemical reaction being calcium carbide.

12. The improvement of claim 11 wherein said calcining kiln further comprises a heat source comprised of heat obtained by combustion of a gaseous fuel derived from a by-product of said reaction.

13. The improvement of claim 11 further comprising a source of water gas coupled to said calcining kiln for fueling said calcining kiln during the calcination of calcium carbonate.

14. The improvement of claim 13 wherein said source of water gas comprises a water gas generator coupled to said reaction vessel to accept therefrom carbon monoxide gas by-products of said chemical reaction to be used in the generation of water gas.

15. The improvement of claim 11 further comprising acetylene gas generation means coupled to said reaction vessel for accepting at least a portion of the calcium carbide by-product of said chemical reaction and generating combustible gas fuel therefrom.

16. The improvement of claim 4 further comprising:
a source of carbonaceous material; and
drying means coupled to said source of carbonaceous material for accepting said material therefrom and driving off moisture from said material to provide a source of dry carbon to said reaction vessel.

17. The improvement of claim 16 wherein said drying means further comprises a heat source comprised of at least one of heat recovered from said carbide by-product of said reaction and heat obtained by combustion of a gaseous fuel derived from a by-product of said reaction.

18. The improvement of claim 17 wherein said drying means further comprises a source of water gas coupled to said heat source for fueling said heat source.

19. The improvement of claim 18 wherein said source of water gas comprises a water gas generator coupled to said reaction vessel to accept therefrom carbon monoxide gas by-products of said chemical reaction to be used in the generation of water gas.

20. The improvement of claim 4 wherein said reaction vessel further comprises controlled means for injecting reactants to be radiated into said reaction vessel.

21. The improvements of claim 20 wherein said reaction vessel further comprises controlled means for outputting carbide reaction-by-products of said chemical reaction from said reaction vessel.

22. The improvements of claim 21 further comprising control linkages coupling said microwave energy source, said controlled means for injecting reactants into said reaction vessel and said means for outputting carbide reaction-by-products from said reaction vessel for de-energizing said microwave energy source while said outputting means is operative to output carbide reaction-by-products and for activating said injecting means to inject a reactant material charge to replace the carbide reaction-by-products being output by said outputting means.

23. The improvement of claim 22 wherein said means for outputting carbide reaction-by-products comprise temperature sensing emission means for alternately aiding and impeding the output of said carbide reaction-by-products from said reaction vessel.

24. The improvement of claim 23 wherein said temperature sensing emission means further comprises a temperature sensing sphincter which opens when its temperature exceeds the reaction temperature of said reactants and which closes when its temperature falls below said reaction temperature.

25. The improvement of claim 4 further comprising a source of aluminum oxide coupled to said reaction vessel for converting said aluminum oxide therein by chemical reaction to aluminum carbide.

26. The improvement of claim 25 further comprising methane gas generation means coupled to said reaction vessel for accepting at least a portion of the aluminum carbide by-product of said chemical reaction and generating combustible gas fuel therefrom.

27. A method for conserving energy required to raise the temperature of two or more reactants to a sufficient temperature to cause said reactants to react chemically to produce at least one desired reaction by-product, comprising the steps of:
injecting two or more reactant materials into a reaction vessel, this step further comprising the step of injecting carbon and an element of at least one of a metal, and boron and silicon in at least one of its elemental, and oxide and hydride forms to produce a carbide by-product;
radiating said two or more reactants with electromagnetic energy other than heat waves to raise the temperature of at least one of said two or more reactants to a sufficient temperature to elevate the temperature of all said reactants sufficiently to cause said reactants to react chemically to produce a carbide by-product;
inhibiting radiation of electromagnetic energy while removing the reaction by-product from the reaction vessel; and
generating a gaseous fuel from a reaction by-product for use in providing supplementary energy requirements of practicing said method.

28. The method of claim 27 further comprising the step of:
deriving the power for radiating said reactants with electromagnetic energy from a microwave energy source.

29. The method of claim 27 wherein the step of injecting two or more reactant materials into a reaction vessel comprises the step of injecting solid material having chemically combined volatile components and the chemical reaction produces a calcinated by-product.

30. A method for conserving energy required to raise the temperature of two or more reactants, one or more of which reactants is non-susceptible to heating by electromagnetic radiation other than heat waves, to a sufficient temperature to cause said reactants to react chemically to produce at least one desired reaction by-product, comprising the steps of:

injecting two or more reactant materials into a reaction vessel; wherein the injecting two or more reactant materials into a reaction vessel comprises the steps of injecting carbon, alumina and cryolite, forming said carbon to provide a fluid retaining vessel and an electrolysis electrode pair within said reaction vessel; radiating said two or more reactants with electromagnetic energy other than heat waves to raise the temperature of at least a selected one of said two or more reactants to a sufficient temperature to cause said at least said selected one of said reactants to conduct heat to all of said reactants so as to thereby elevate the temperature of all said reactants sufficiently to cause said reactants to react chemically to produce a desired reaction by-product; and inhibiting radiation of electromagnetic energy while removing the reaction by-product from the reaction vessel.

31. The method of claim 30 further comprising the step of subjecting said temperature elevated reactants to an electrolysis action to produce aluminum and carbon dioxide by-products.

32. The method of claim 27 further comprising the step of drying said carbon prior to injecting it into said reaction vessel.

33. The method of claim 32 further comprising the steps of recovering heat from the reaction by-product removed from the reaction vessel and applying the heat so recovered to the carbon to dry same.

34. The method of claim 33 wherein the step of injecting two or more reactant materials into a reaction vessel comprises the step of injecting carbon and aluminum oxide to produce an aluminum carbide by-product.

35. The method of claim 34 further comprising the step of calcining aluminum hydroxide to provide a source of aluminum oxide for injection into said reaction vessel to produce an aluminum carbide by-product.

36. The method of claim 33 wherein the step of injecting two or more reactant materials into a reaction vessel comprises the step of injecting carbon and calcium oxide to produce a calcium carbide by-product.

37. The method of claim 36 further comprising the step of calcining calcium carbonate to provide a source of calcium oxide for injection into said reaction vessel to produce a calcium carbide by-product.

* * * * *